(12) United States Patent
Rekewitz

(10) Patent No.: US 6,272,423 B1
(45) Date of Patent: Aug. 7, 2001

(54) METHOD FOR CORRECTING AIRFLOW IN AN INTERNAL COMBUSTION ENGINE WHICH IS DRAWN IN THROUGH AN INDUCTION PIPE AND MEASURED IN THE INDUCTION PIPE

(75) Inventor: Gert Rekewitz, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/323,954

(22) Filed: Jun. 2, 1999

(30) Foreign Application Priority Data

Jun. 5, 1998 (DE) ............................................. 198 25 305

(51) Int. Cl.⁷ ..................................................... F02D 41/18
(52) U.S. Cl. ......................... 701/102; 73/118.2; 123/488
(58) Field of Search ................... 701/102, 114, 701/115; 73/118.2; 123/488

(56) References Cited

U.S. PATENT DOCUMENTS

| 4,468,963 | 9/1984 | Schäuble | 73/204 |
| 4,510,795 | 4/1985 | Sumal | 73/118 |
| 4,664,085 | 5/1987 | Kataoka | 123/478 |
| 4,774,833 | 10/1988 | Weibler et al. | 73/118.2 |
| 4,846,132 | * 7/1989 | Binnewies | 73/118.2 |
| 5,668,313 | 9/1997 | Hecht et al. | 73/118.2 |

FOREIGN PATENT DOCUMENTS

| 33 44 276 | 6/1984 | (DE) . |
| 39 10 676 | 10/1990 | (DE) . |
| 44 01 828 | 7/1995 | (DE) . |
| 44 33 044 | 3/1996 | (DE) . |
| 195 13 975 | 10/1996 | (DE) . |
| 195 38 451 | 11/1996 | (DE) . |
| 2-290513 | * 11/1990 | (JP) . |
| 8-35869 | * 2/1996 | (JP) . |

* cited by examiner

*Primary Examiner*—Andrew M. Dolinar
(74) *Attorney, Agent, or Firm*—Crowell & Moring, L.L.P.

(57) ABSTRACT

A method and apparatus is provided for correcting the airflow in a combustion engine drawn in through an induction pipe and measured in the induction pipe. The measured airflow is multiplied by a correction factor which is formed as a function of a value expressing the degree of the measurement error and a value expressing the direction of the measurement error. Preferably, the value expressing the degree of the measurement error is obtained by calculating the standard deviation or the variance of the measured airflow. The value expressing the direction of the measurement error is determined with at least one additional operating value of the internal combustion engine.

13 Claims, 1 Drawing Sheet

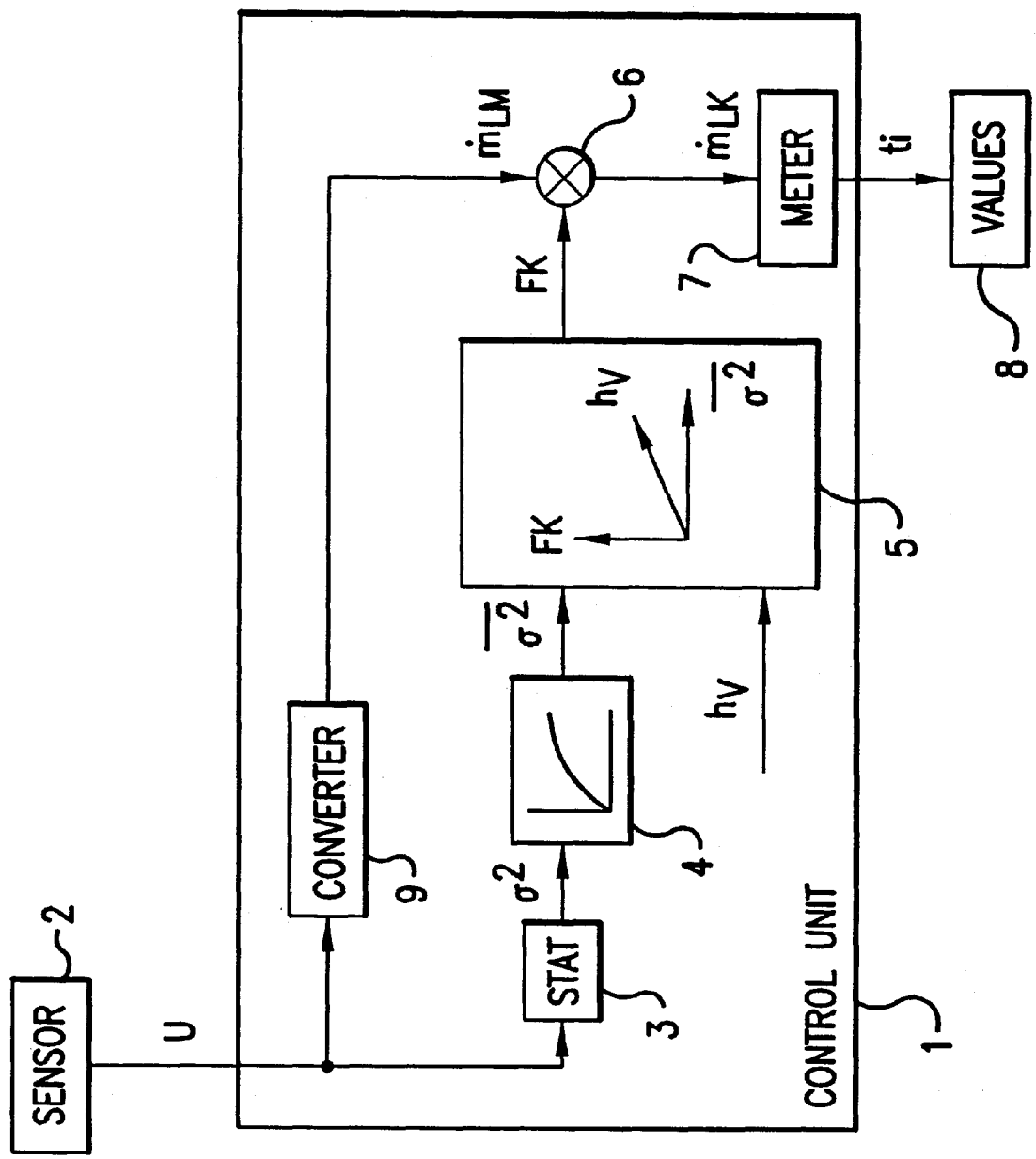

METHOD FOR CORRECTING AIRFLOW IN AN INTERNAL COMBUSTION ENGINE WHICH IS DRAWN IN THROUGH AN INDUCTION PIPE AND MEASURED IN THE INDUCTION PIPE

BACKGROUND AND SUMMARY OF THE INVENTION

This application claims the priority of DE 198 25 305.2, filed Jun. 5, 1998, the disclosure of which is expressly incorporated by reference herein.

The invention relates to a method for correcting the airflow in an internal combustion engine, drawn in through an induction pipe and measured in the induction pipe.

A method of this kind is known for example from German Patent document DE 33 44 276 C2. In this known method, the volume of air drawn into the internal combustion engine is measured using a thermal flow meter. A differential of the volume of air drawn in is determined on the basis of a changing property of the volume of air drawn in. The differential represents a measure of the magnitude of the oscillations of the drawn-in air. A correction is performed on the basis of this differential. However, such a correction by means of the differential reacts in an undesirably sensitive manner to even brief pulsations and/or changes in the oscillation of the amplitude.

To establish the need for a method for correcting the airflow drawn in through an induction pipe and measured in the induction pipe in an internal combustion engine, the technical area is described below.

In engine control devices for internal combustion engines, the drawn-in airflow is measured by a special sensor, for example a hot-film airflow meter. For this purpose, the output voltage of the sensor is sampled in a time-synchronized manner and converted to a corresponding airflow value by characteristic interpretation. Then, the calculated values are added together. Finally, in synchronization with the crankshaft (for example, all 180° crankshafts in four-cylinder internal combustion engines) the arithmetic average is formed. This average is also termed the load signal and is used, in particular, for determining the ignition point and for calculating the injection time, for example for achieving a stoichiometric combustion.

Depending on the type of engine and the induction pipe geometry, at certain operating points oscillations of the air column in the induction pipe (pulsations) develop. These oscillations cause incorrect measurements at the sensor located in the induction pipe (undesired measurement of the reflow). Minor oscillations can be eliminated by forming the average, in other words generating the average provides a correct result. The reflows, however, can become so large that the measured airflow no longer corresponds to the true average. As a result, an incorrectly calculated injection time results and hence non-ideal combustion that leads to deteriorated exhaust behavior. The A/F control used in vehicles equipped with catalytic converters and with the oxygen sensor located in the exhaust line can compensate only partially for this improper adjustment since the incorrect measurements can exceed its regulating range.

The goal of the present invention is to detect these pulsations and to correct the measured average. In addition, the correction is made by a method that is not sensitive to interference.

This goal is achieved by a method for correcting the airflow in an internal combustion engine dawn in through an induction pipe and measured in the induction pipe, characterized in that the measured airflow (U or $\dot{m}_{LM}$) is multiplied by a correction factor (KS) that is formed as a function of a value expressing the degree of the measurement error $\sigma^2$ and a value expressing the direction of the measurement error $h_y$.

Advantageous improvements are described herein.

According to the invention, the measured airflow, especially in the form of the measured average, is multiplied by a correction factor that is formed as a function of a value expressing the degree of the measurement error and a value expressing the direction of the measurement error.

Preferably, the value expressing the degree of the measurement error is determined by means of a statistical calculation method. Calculation of the known standard deviation $\sigma$ or the variance $\sigma^2$ is suitable for this purpose. The value expressing the degree of the measurement error corresponds to the degree of pulsations of the oscillating airflow in the induction pipe. To calculate the standard deviation, the sum of the input voltages and the sum of the squares of the input voltages of a sensor (for example a hot-film airflow meter) must be calculated. The standard deviation is determined on a segment-synchronized basis corresponding to averaging in calculating the airflow. The value expressing the degree of the measurement error (for example the standard deviation or variance) can be used directly for correcting the measured airflow, with the measured and preferably averaged value of the airflow being multiplied by a correction factor that is preferably obtained from a characteristic, a characteristic map, or even from a characteristic space. The value expressing the degree of the measurement error provides only information on the amount by which the measured airflow is corrected, but there is no information on whether the correction should involve increasing or reducing the measured airflow.

This second piece of information is supplied by the value expressing the direction of the measurement error. The value expressing the direction of the measurement error is determined by at least one operating value of the internal combustion engine, for example the engine rpm and/or the throttle position and/or the valve lift in internal combustion engines with lift adjustment of the intake valves. For this purpose, operating values are used in particular by which an anticipated airflow in the induction pipe can be estimated from the resultant operating state of the internal combustion engine. For example, the estimated anticipated airflow is compared with the measured airflow in the form of a plausibility monitoring function. If the measured airflow is higher than the anticipated estimated airflow because of the available operating value, the value expressing the direction of the measurement error provides the information that the measured airflow must be reduced for correction. However, if the measured airflow is less than the airflow to be anticipated on the basis of the available operating value, the value expressing the direction of the measurement error provides the information that the measured airflow must be increased during correction. The operating value itself can be the value expressing the direction of the measurement error.

Preferably, the correction factor is determined by use of a characteristic map whose first input value is the value expressing the degree of the measurement error and whose second input value is the value expressing the direction of the measurement error.

With this method according to the invention, a highly accurate and interference-insensitive correction of the measured airflow in the induction pipe is possible.

Other objects, advantages and novel features of the present invention will become apparent from the following detailed description of the invention when considered in conjunction with the accompanying drawings.

BRIEF DESCRIPTION OF THE DRAWING

The drawing shows an embodiment of the invention for implementing the method for correcting the air flow as part of an engine control device.

DETAILED DESCRIPTION OF THE DRAWING

In the single FIGURE, the components required for the method according to the invention consist of the internal combustion engine control device 1 which is provided in any event for various engine functions. The components required for other functions of engine control device 1 are not shown here.

The voltage signal U of a hot-film airflow meter 2, located in an induction pipe (not shown), is the input signal of the internal combustion engine control device 1. The voltage signal U is supplied firstly to the statistical block 3 and secondly to the signal conversion block 9. The variance $\sigma^2$ is calculated in the statistical block 3 using the following formula:

$$\sigma^2 = \left(\sum_{i=1}^{N} U_i^2 - N\overline{U}^2\right) \Big/ (N-1) \tag{1}$$

where $U_1$ is the sampled measured value, $U_i^2$ is the square of the measured value, $\overline{U}$ is the calculated average, and N is the number of sampled measurement values of voltage signal U.

The standard deviation $\sigma$ could also be calculated in statistical block 3, but a calculation of the root would have to be performed for this purpose which is costly from the programming standpoint. In order to simplify the calculation of the variance $\sigma^2$ from the programming standpoint, formula (1) is converted to the following formula:

$$\sigma^2 = \left(N \times \sum_{i=1}^{N} U_1^2 - \left(\sum_{i=1}^{N} U_1\right)\right) \Big/ ((N-1) \times N) \tag{2}$$

The variance $\sigma^2$ thus calculated is preferably fed through a low-pass filter 4. This produces an average variance $\overline{\sigma^2}$ as the value that represents the degree of measurement error. This value expressing the degree of the measurement error $\overline{\sigma^2}$ is the first input signal of a characteristic map 5. In addition, characteristic map 5 receives as the second input signal the operating value $h_v$ of the internal combustion engine which, in the present example, corresponds to the specified lift in an internal combustion engine with lift adjustment of the intake valves. The operating value $h_v$ in the form of the specified lift corresponds to the value expressing the direction of the measurement error.

Depending on the value expressing the degree of the measurement error $\overline{\sigma^2}$ and on the value expressing the direction of the measurement error $h_v$ a correction factor FK is obtained in characteristic map 5. Characteristic map 5 for example can be determined empirically and stored in the engine control device 1. However, correction factor FK can also be determined as a function of the value expressing the degree of the measurement error and the value expressing the direction of the measurement error by an estimation model or an algorithm. The correction factor FK obtained in characteristic map 5 is supplied to a multiplier 6. Another input signal to the multiplier 6 is the measured airflow following arithmetic averaging and conversion of voltage signal U in the single conversion block 9. The measured airflow $\dot{m}_{LM}$ is multiplied in the multiplier 6 by correction factor FK, producing the corrected airflow $\dot{m}_{LK}$. According to the invention, the voltage signal U itself could be used as the value to be corrected, as an alternative, so that a voltage signal would likewise be obtained as the corrected measured value that could then be processed further accordingly.

Then, depending on the corrected airflow $\dot{m}_{LK}$, the injection time ti required for a desired combustion behavior is obtained in fuel metering block 7 as a function of the corrected airflow $\dot{m}_{LK}$. Injection valves 8 are actuated by internal combustion engine control device 1 for the injection time ti determined.

Optimum combustion and hence exhaust minimization are possible with this embodiment according to the invention.

It should also be pointed out that operating values which in particular represent the throttling amount of the air drawn into the induction pipe can be used as the operating value or operating values to determine the value expressing the direction of the measurement error. With the method according to the invention, measurement errors can be reliably prevented that occur in particular with slight throttling by turbulence.

The correction of airflow drawing in through an induction pipe in an internal combustion engine controlled by a controlled unit can be accomplished by a software product which uses a computer readable medium having stored thereon program code segments that operated on a measured airflow signal value by multiplying the value by a correction factor formed as a predefined function of a value expressing a degree of measurement error and a value expressing a direction of measurement error.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for correcting airflow in an internal combustion engine drawn-in through an induction pipe, the method comprising the acts of:

measuring the airflow drawn-in through the induction pipe to obtain a measured airflow;

multiplying the measured airflow by a correction factor formed as a predefined function of a value expressing a degree of measurement error and a value expressing a direction of measurement error.

2. The method according to claim 1, further comprising the act of determining the value expressing the degree of the measurement error by calculating a standard deviation or variance of the measured air flow.

3. The method according to claim 1, further comprising the act of determining the value expressing the direction of the measurement error by at least one additional operating value of the internal combustion engine.

4. The method according to claim 2, further comprising the act of determining the value expressing the direction of the measurement error by at least one additional operating value of the internal combustion engine.

5. An apparatus for correcting airflow drawn-in through an induction pipe in an internal combustion engine, the apparatus comprising:

a sensor for measuring the drawn-in airflow in the induction pipe;

a control unit coupled to the sensor and receiving a measured airflow signal from the sensor, said control unit multiplying the measured airflow signal by a correction factor formed as a predefined function of a value expressing a degree of measurement error and a value expressing a direction of measurement error.

6. The apparatus according to claim 5, wherein said control unit determines the value expressing the degree of the measurement error by calculating a standard deviation or variance of the measured air flow.

7. The apparatus according to claim 5, wherein said control unit determines the value expressing the direction of the measurement error by factoring into account at least one additional operating value of the internal combustion engine.

8. A software product for correcting airflow drawn-in through an induction pipe in an internal combustion engine controlled by a control unit, the software product comprising:

a computer readable medium having stored thereon program code segments that operate on a measured airflow signal value by multiplying said value via a correction factor formed as a predefined function of a value expressing a degree of measurement error and a value expressing a direction of measurement error.

9. A method for correcting airflow drawn-in through an induction pipe of an internal combustion engine, the method comprising the acts of:

measuring the drawn-in airflow in the induction pipe to obtain a measured airflow value;

statistically calculating a value expressing a degree of measurement error of the measured airflow value;

determining a value expressing a direction of measurement error using at least one operating value of the internal combustion engine;

determining a correction factor based on a predefined function of said value expressing a degree of measurement error and said value expressing a direction of the measurement error;

multiplying the measured airflow value by the correction factor to obtain a corrected airflow value; and using the corrected airflow value to control operation of the internal combustion engine.

10. The method according to claim 9, wherein the act of statistically calculating the degree of measurement error comprises the act of calculating one of a standard deviation and variance value representing the degree of measurement error.

11. The method according to claim 9, wherein the act of determining the correction factor comprises the act of looking- up the correction factor using a characteristic map.

12. The method according to claim 11, wherein the act of looking-up the correction factor further comprises the act of initially empirically determining the characteristic map and storing the characteristic map in the engine control unit.

13. The method according to claim 9, wherein the act of determining the correction factor comprises the act of modeling the correction factor as a function of the value expressing the degree of measurement error and the value expressing the direction of measurement error.

* * * * *